United States Patent [19]

Kosky et al.

[11] Patent Number: 4,590,259

[45] Date of Patent: May 20, 1986

[54] HIGH MOLECULAR WEIGHT LINEAR POLYESTERS AND METHOD FOR THEIR PREPARATION

[75] Inventors: Philip G. Kosky, Schenectady; Elizabeth A. Guggenheim, Scotia, both of N.Y.

[73] Assignee: General Electric Company, Schenectady, N.Y.

[21] Appl. No.: 677,114

[22] Filed: Nov. 30, 1984

[51] Int. Cl.$^4$ .............................................. C08G 63/76
[52] U.S. Cl. .................... 528/272; 528/274; 528/308.1
[58] Field of Search ...................... 528/272, 274, 308.1

[56] References Cited

U.S. PATENT DOCUMENTS

| | | |
|---|---|---|
| 3,161,710 | 12/1964 | Turner . |
| 3,756,990 | 9/1973 | Jaeger ................................. 528/481 |
| 4,069,278 | 1/1978 | Borman et al. |
| 4,246,377 | 1/1981 | Charles et al. |
| 4,329,444 | 5/1982 | Borman ............................... 528/274 |
| 4,346,213 | 8/1982 | Hall ..................................... 528/272 |
| 4,360,661 | 11/1982 | Horlbeck ............................ 528/272 |
| 4,374,975 | 2/1983 | Duh ..................................... 528/272 |
| 4,446,303 | 5/1984 | Moore ................................. 528/272 |

FOREIGN PATENT DOCUMENTS 1035894 4/1978 Canada .

OTHER PUBLICATIONS

Buxbaum, J. *Appl. Poly. Sci.: App. Polymer Symposium*, 35, 59–66, (1979).

*Primary Examiner*—Paul R. Michl
*Attorney, Agent, or Firm*—William H. Pittman; James C. Davis, Jr.; James Magee, Jr.

[57] ABSTRACT

The molecular weight of linear polyesters such as poly(butylene terephthalate) and poly(ethylene terephthalate), especially the former, is increased by contacting a polyester having a maximum particle diameter of 1.0 and preferably 0.5 mm., with a mixture of an inert gas and an aliphatic diol such as 1,4-butanediol in the gaseous state at a temperature about 5°–15° C. below its equilibrium melting temperature, at a diol partial pressure of about 0.1–10 torr, to reduce the proportion of acid end groups; and subjecting the product thus obtained to solid state polymerization under vacuum. By this method, polyesters having a number average molecular weight of at least 100,000, useful for blow molding and the like, can be obtained.

15 Claims, 9 Drawing Figures

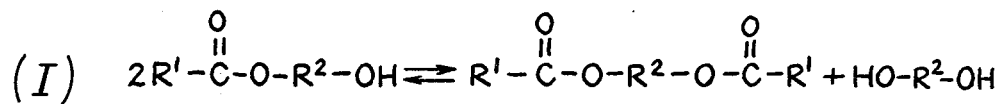
(I) $2R^1-\overset{\overset{O}{\|}}{C}-O-R^2-OH \rightleftharpoons R^1-\overset{\overset{O}{\|}}{C}-O-R^2-O-\overset{\overset{O}{\|}}{C}-R^1 + HO-R^2-OH$
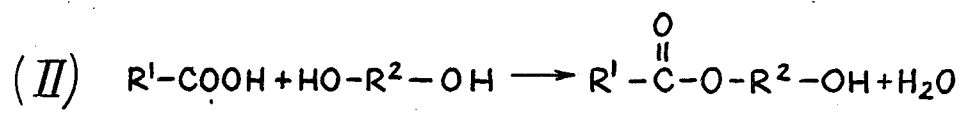
(II) $R^1-COOH + HO-R^2-OH \longrightarrow R^1-\overset{\overset{O}{\|}}{C}-O-R^2-OH + H_2O$
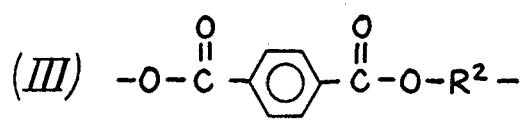
(III) $-O-\overset{\overset{O}{\|}}{C}-\underset{}{\bigcirc}-\overset{\overset{O}{\|}}{C}-O-R^2-$
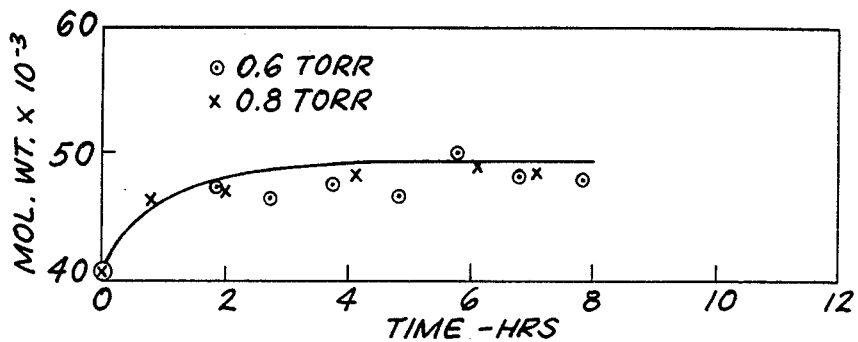
FIG. IV
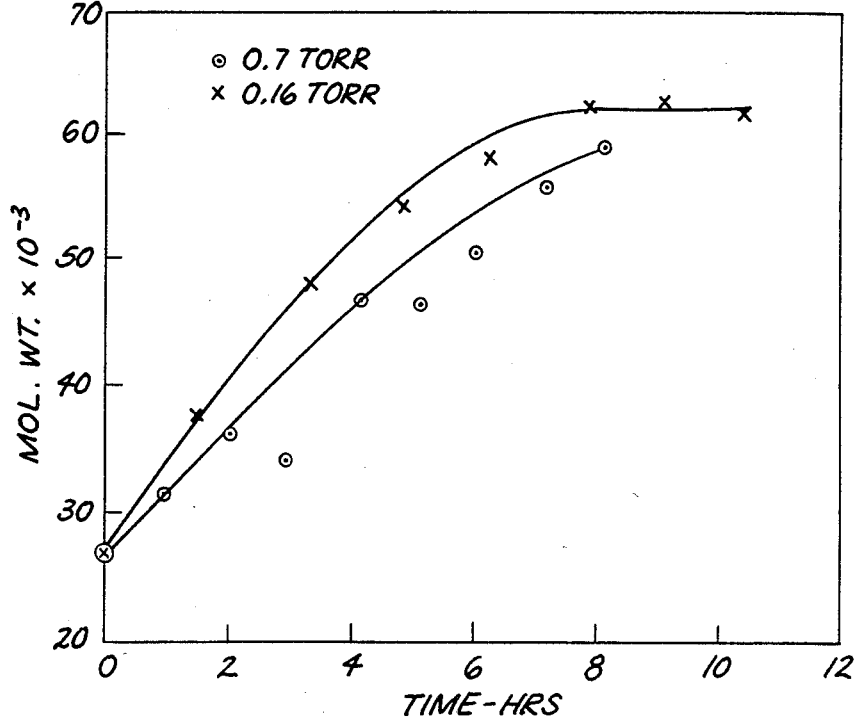
FIG. V

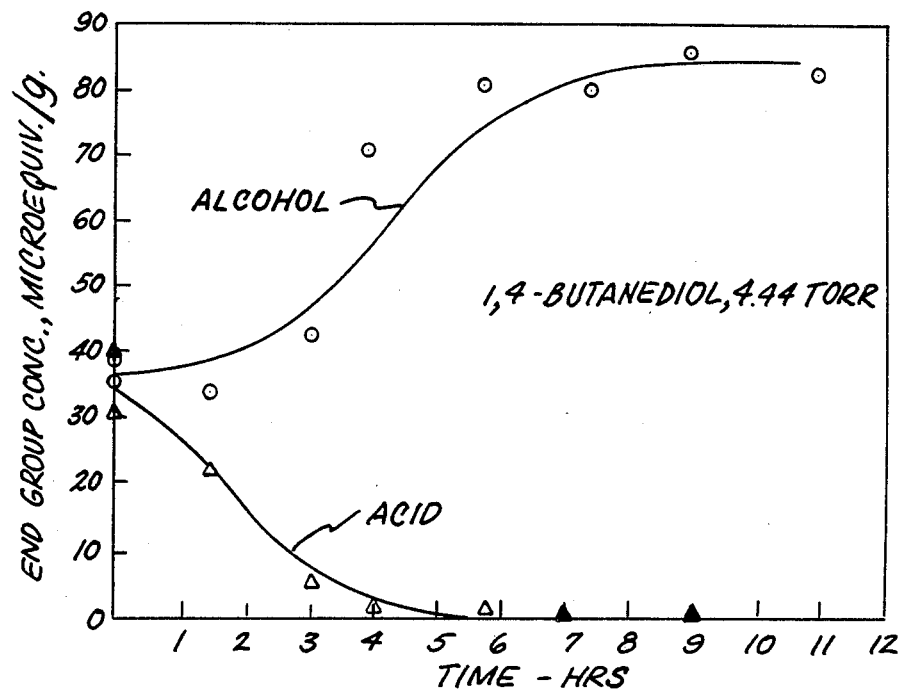
FIG. VI
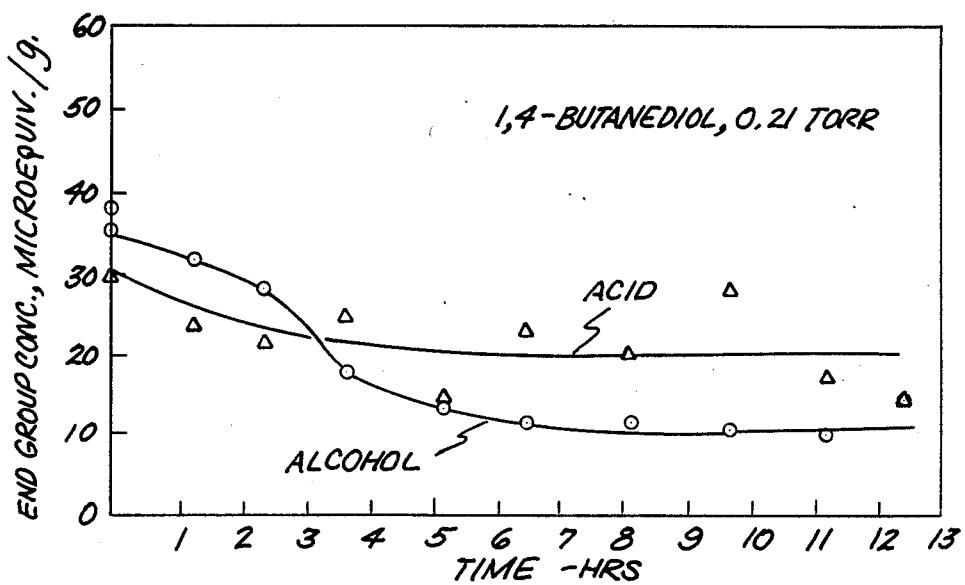
FIG. VII

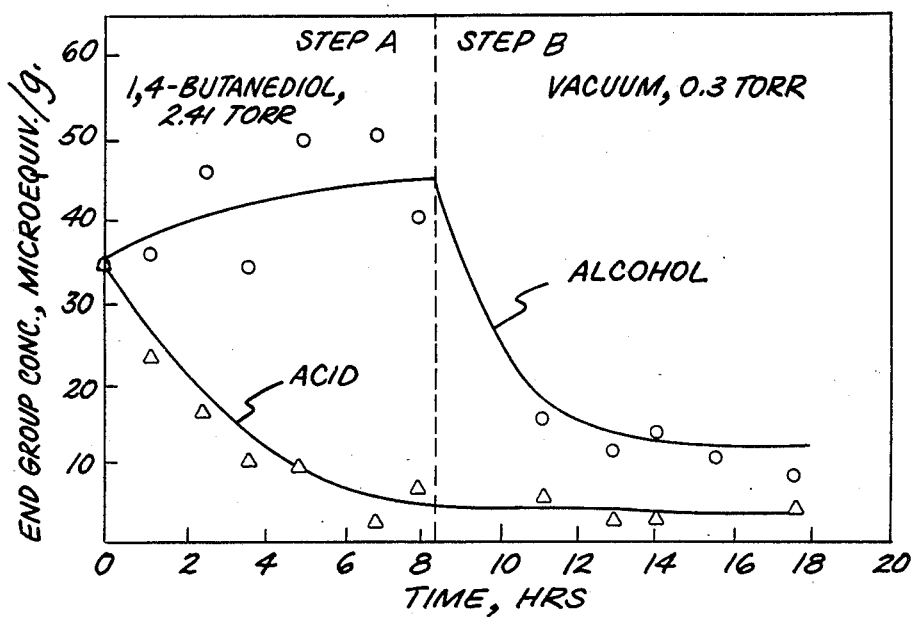
FIG. VIII
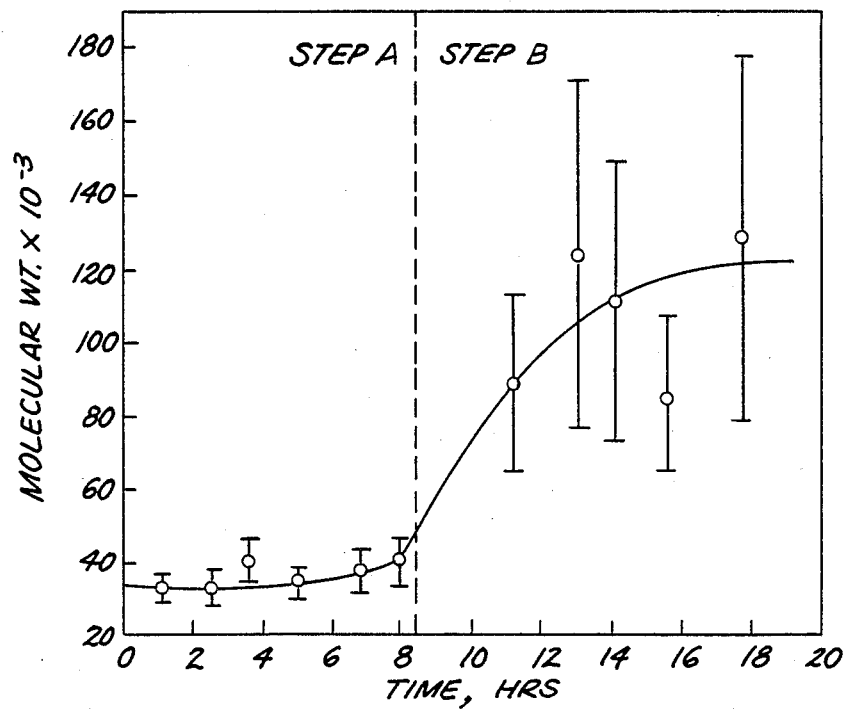
FIG. IX

HIGH MOLECULAR WEIGHT LINEAR POLYESTERS AND METHOD FOR THEIR PREPARATION

This invention relates to high molecular weight linear polyesters and a method for their preparation. In particular, it relates to poly(alkylene terephthalates) having a high and substantially uniform number average molecular weight.

Solid linear polyesters, exemplified by poly(ethylene terephthalate) and poly(butylene terephthalate) (hereinafter "PET" and "PBT", respectively), are commonly prepared by the reaction of an alkanediol with a terephthalate ester such as dimethyl terephthalate, or, less often, with terephthalic acid. This reaction is ordinarily conducted in the presence of a catalyst, and catalyst traces remain in the polyester. Such polyesters are in wide industrial use for the preparation of articles by such process as injection molding, blow molding and fiber formation. In particular, PET is used in the manufacture of containers for soft drinks and the like by blow molding. Polymers used for blow molding must have very high melt viscosities and consequently very high molecular weights. In the case of PET, such high molecular weights are typically attained by solid state polymerization, in the presence of the remaining catalyst traces.

Many of the properties of PBT make its use as a blow molding polymer attractive. One such property is its relatively low porosity to gas, making it an excellent oxygen barrier for the protection of oxygen-labile food products such as beer and wine. Another is the fact that PBT is relatively stable to degradation and degrades, if at all, with the evolution of tetrahydrofuran, a relatively harmless chemical. For these reasons, it would be advantageous to obtain PBT of a melt viscosity which could be blow molded, either alone or by co-blow molding with PET to provide a container with a relatively gas-impervious envelope.

A problem in obtaining linear polyesters, especially PBT, having molecular weights high enough for blow molding is the presence of carboxylic acid end groups. Such end groups inhibit building of the molecular weight to the necessary levels. This is demonstrated graphically in FIGS. IV and V, representing PBT solid state polymerization procedures conducted under vacuum. FIG. IV shows an increase of the molecular weight of one sample from about 40,000 to no more than 50,000 over 8 hours. FIG. V similarly shows an increase for another sample from about 20,000 to 60,000 or less over 10 hours. Such molecular weights are not generally acceptable for blow molding.

Another problem of particular significance with PBT is its high degree of crystallinity. Molecular weight buildup typically occurs by the equilibrium reaction represented by equation I in the drawings, wherein $R^1$ is the remainder of the polymer molecule and $R^2$ is a lower alkylene group (that is, an alkylene group containing up to 7 carbon atoms). The diol thus liberated must be removed in order to drive the reaction to the right. It is hard to remove the diol, however, from large particles of a polyester having a crystalline fraction of substantial proportions.

The result of these two problems is that linear polyesters comprising particles having uniform molecular weights high enough for blow molding have been difficult or impossible to obtain on a commercial scale.

Buxbaum discloses, in *Journal of Applied Polymer Science: Applied Polymer Symposium*, 35, 59–66 (1979), PBT polymers with intrinsic viscosities as high as 4.00, but these high values are found only near the surfaces of the polymer particles and the values decrease by nearly 50% near the centers thereof. Similarly, PET having an intrinsic viscosity of 2.20, corresponding to a number average molecular weight of about 125,000, is disclosed in Example 9 of U.S. Pat. No. 3,161,710 as having been prepared from bis(2-hydroxyethyl) terephthalate, but only in the form of a film 0.2 mil thick obtained by heating a monomer film on a metal tape.

A principal object of the present invention, therefore, is to provide linear polyesters having particles of uniformly high molecular weight and a method for their preparation.

A further object is to provide a solid state method for the preparation of linear polyesters, especially PBT.

A further object is to provide linear polyesters having molecular weights and melt viscosities suitable for blow molding.

A still further object is to eliminate from linear polyesters the carboxylic acid end groups which inhibit their building to uniformly high molecular weight.

Other objects will in part be obvious and will in part appear hereinafter.

In one of its aspects, the present invention comprises linear poly(alkylene terephthalates) comprising particles having a substantially uniform calculated number average molecular weight of at least about 100,000. In another aspect, the invention comprises a method for increasing the molecular weight of at least one solid linear poly(alkylene terephthalate) containing a minor amount of esterification catalyst, said method comprising the steps of:

(A) contacting said polyester, in the form of particles having a maximum diameter of 1.0 mm., at a temperature about 5–15° C. below its equilibrium melting point, with a mixture of an inert gas and at least one aliphatic diol in the gaseous state, the partial pressure of said diol being about 0.1–10 torr, until the proportion of acidic end groups in said polyester has been substantially reduced; and (B) subjecting the product of step A to solid state polymerization at a maximum pressure of about 1 torr.

The present invention is based on a number of discoveries regarding the nature of poly(alkylene terephthalates) and of the reactions leading to their formation. In the first place, the acid end groups which inhibit polymerization may be subjected to the reaction represented by equation II, with a diol in the presence of esterification catalyst. Hydroxyalkyl-terminated polymer molecules are thus formed which may in turn interreact in accordance with equation I as noted hereinabove, to form molecular species of higher molecular weight.

In the second place, efficient removal of diol is necessary to drive equation I to the right. Thus, the effect of diol in reaction I is directly the opposite of its effect in reaction II. Diol removal is facilitated by reducing the size of the polymer particles, which may then undergo the molecular weight building reaction under solid state polymerization conditions.

The linear polyesters with which the present invention is concerned contain structural units of formula III, wherein $R^2$ is as previously defined. Polymer molecules containing more than one $R^2$ species are within the scope of the invention, but those in which all $R^2$ values are the same are preferred. Illustrative $R^2$ values are ethylene, propylene, trimethylene, tetramethylene (1,4-butylene), pentamethylene and hexamethylene. Preferably, $R^2$ is an ethylene or tetramethylene group; i.e., it is derived from ethylene glycol or 1,4-butanediol. In such cases, the linear polyester obtained is PET or PBT, respectively. The invention is particularly applicable to PBT.

In order to be useful in the method of this invention, the polyester must contain a minor amount of esterification catalyst. As previously noted, such catalyst ordinarily remains in the polyester upon completion of the initial esterification reaction. Any catalyst suitable for said initial reaction may be used; examples are various sodium, calcium, titanium, copper, zinc, cadmium, mercury, aluminum, germanium, lead, antimony, chromium, manganese, cobalt and nickel compounds. Specific examples of compounds useful as catalysts include sodium acetate, calcium acetate, titanium(IV) 2-ethylhexoxide, the titanium chelates disclosed in U.S. Pat. Nos. 4,452,969 and 4,452,970 (the disclosures of which are incorporated by reference herein), zinc sulfate, zinc formate, zinc acetate, cadmium acetate, lead(II) oxide, lead(II) acetate, manganese(II) acetate and cobalt(II) acetate. Titanium compounds, especially the alkoxides, are frequently preferred. The proportion of catalyst in the polyester is generally about 80–200 ppm., preferably about 100–150 ppm.

In step A of the method of this invention, a linear polyester having a maximum particle size of 1.0 and preferably 0.5 mm., typically about 0.25–0.5 mm., is employed. Such particle sizes may be attained by conventional means. For example, extrusion in the melt followed by chopping can produce particles of a suitable size, or larger particles can be reduced in size by cryogenic milling, as by cooling in liquid nitrogen followed by milling in a suitable particle size-reducing apparatus.

The small particle size polyester is contacted with a mixture of an inert gas and at least one aliphatic diol. The diol typically has the formula HO-$R^2$-OH, wherein $R^2$ is the alkylene radical in the poly(alkylene terephthalate), and is usually ethylene glycol or 1,4-butanediol, preferably the latter. Suitable inert gases are nitrogen and argon, with nitrogen generally being preferred because of its wide availability and relatively low cost. On a commercial scale, this step may often be conveniently performed in a fluidized bed, using the inert gas-diol mixture as the fluidizing medium. Alternatively, a heated tumbling bed system may be used in both of steps A and B.

The conditions of step A are chosen so as to strike a balance between the rate of the reaction represented by equation II and the rate and direction of that represented by equation I. If the temperature and/or diol partial pressure are too low, diol diffusion into the crystalline particles of the polyester will be insufficient and reaction II will proceed too slowly for adequate reduction of acid end groups to occur within the time available. On the other hand, diol partial pressure too high will drive reaction I to the left. At best, the result will be an insufficient degree of molecular weight buildup; at worst, a decrease in molecular weight will occur.

Balancing these factors, it has been discovered that a temperature about 5°–15° below the equilibrium melting point of the polymer (that is, the temperature at which the last crystalline material becomes liquid as the polymer is heated) and a diol partial pressure of about 0.5–10 torr are acceptable. Dealing first with temperature, PBT is a substantially crystalline polymer and has an equilibrium melting point of 227° C.; therefore, the temperature range for step A in the case of PBT is 212°–222° C., with 215°–220° C. being preferred. In order for PET to be crystalline, it must be annealed and/or nucleated, and this is inherently accomplished when the temperature is raised for a sufficient time. After crystallization, the equilibrium melting point of PET is 256° C., so that the operating range for step A is 241°–251° C.

The preferred diol partial pressure range, particularly for PBT, is about 0.2–5.0 torr. At 2.0–2.5 torr, the acid end groups decrease substantially while the alcohol end groups increase only moderately. Therefore, this range is particularly preferred.

During step A, the polymer may be periodically analyzed to determine the concentration of acid end groups. When said concentration has been reduced to the desired level, step A is terminated. For maximum molecular weight, there should be no acid end groups remaining at the conclusion of step A. However, an acid end group concentration as high as 25 microequivalents per gram may be tolerated under certain conditions. For a polymer molecular weight of 100,000, the acid end group concentration should be no higher than 20 microequivalents per gram.

The purpose of step A, as previously indicated, is to reduce the acid end group concentration in accordance with equation II. By contrast, the purpose of step B is to build molecular weight in accordance with equation I. Therefore, the conditions of step B are such as to drive the reaction represented by said equation to the right, which requires efficient removal of diol from the polymer particles. This is effected by solid state polymerization at a temperature substantially equal to that of step A, and at a maximum pressure of about 1 torr, preferably about 0.05–0.5 torr.

The size of the polymer particles is of primary importance, since the reaction conditions in both steps should be such that the reaction is controlled by its kinetics rather than by the rate of diffusion of the diol from the polymer. Large crystalline particles present a significant diffusion barrier; therefore, small particle size is critical.

By varying the conditions of Steps A and B, such as, temperature, pressure (including partial pressure) and reaction time, it is possible to produce polyesters with various molecular weights, tailored to the intended end use. In particular, it is possible to obtain polyesters having extremely high molecular weights, and consequently, also high melt viscosities. The number average molecular weights are frequently above 100,000 and are highly uniform throughout the polyester particle, generally varying by less than 15% and frequently less than 10% from the outer rim of the particle to a circumference representing 30% by weight of the particle. These variations may be detected by fractionally dissolving the particle in a suitable solvent, with periodic measurement of a molecular weight-related parameter on the fractions removed by dissolution.

The number average molecular weights herein were determined either by intrinsic viscosity (IV) at 30° C. in a mixture of 60% (by weight) phenol and 40% 1,1,2,2-tetrachloroethane, or by quantitative infrared analysis of the hydroxy and carboxy end groups in the polymer. By comparing the molecular weights and intrinsic viscosities of a number of polymers of a single chemical species (e.g., PET or PBT) having known molecular weights, it is possible to determine the mathematical relationship between intrinsic viscosity and molecular weight. For PET and PBT, the relationships are defined by the following equations:

PET:

$$V = 3.72 \times 10^{-4} M^{0.74}$$

PBT:

$$V = 1.17 \times 10^{-4} M^{0.87}$$

wherein M is the number average molecular weight and V is the intrinsic viscosity. The values obtained by end group analysis are very close to those obtained from intrinsic viscosity.

The method of this invention is illustrated by a laboratory-scale procedure in which a PBT polyester having a molecular weight (determined from intrinsic viscosity) of about 25,000, and containing 112 ppm. of titanium(IV) 2-ethylhexoxide catalyst, was ground to a particle size less than 0.5 mm. and placed in a round-bottomed flask attached to a rotary evaporator and heated in an oil bath. A mixture of nitrogen and a regulated amount of 1,4-butanediol, calculated to provide a constant partial pressure thereof, was heated and passed into the flask which was maintained at 218° C. The flask was rotated in the oil bath for about 8-12 hours, with samples being removed periodically and subjected to infrared analysis for alcohol and acid end groups. The flask was then evacuated to a pressure of 0.3 torr and heating was continued for the desired period.

DESCRIPTION OF THE FIGURES

FIG. 1 shows the interreaction of hydroxyalkyl-terminated polymer molecules to form higher molecular weight species.

FIG. 2 shows the reaction of polyalkylene terephthalates having acid end groups with diol to form hydroxyalkyl-terminated polymer molecules.

FIG. 3 shows the structural units of the linear polyesters with which the present invention is concerned.

FIGS. 4 and 5 graphically demonstrate that the presence of carboxylic acid end groups inhibits building of the molecular weight to the necessary levels.

The results of various runs using the above procedure are illustrated graphically in FIGS. VI-IX. FIGS. VI and VII show the results of step A at 1,4-butanediol partial pressures of 4.44 and 0.21 torr. As will be apparent, at 4.44 torr (FIG. VI) the concentration of alcohol end groups increased primarily at the expense of acid end groups, indicating that reaction II predominates and little molecular weight buildup (reaction I) occurs. By contrast, at 0.21 torr (FIG. VII) the acid and alcohol end groups both decreased, the former more slowly (for the most part) than the latter. This indicates that reactions I (to the right) and II were both occurring but that the rate of reaction II was quite low.

FIGS. VIII-IX show the results of a run including both steps A and B. In this case the 1,4-butanediol partial pressure in step A was 2.41 torr, which is very slightly higher than the equilibrium value for reaction I. FIG. VIII shows that acid groups decreased substantially in step A while alcohol groups increased moderately. In step B the alcohol end groups decreased, indicating a substantial increase in polymer chain length and molecular weight.

FIG. IX shows the relationship of molecular weight (by end group analysis) to elapsed time in the same run. As is apparent, molecular weight increased little during step A but markedly during step B, to a final value equal to or higher than 125,000. (The ranges indicated for the points plotted represent the degree of experimental error which might be expected. Obviously, the extremely low end group levels for high molecular weight polymers are subject to a higher percentage error than the substantially higher levels for lower molecular weights.)

What is claimed is:

1. A method for increasing the molecular weight of at least one solid linear poly(alkylene terephthalate) containing a minor amount of esterification catalyst, said method comprising the steps of:
    (A) contacting said polyester, in the form of particles having a maximum diameter of 1.0 mm., at a temperature about 5°-15° C. below its equilibrium melting temperature, with a mixture of an inert gas and at least one aliphatic diol in the gaseous state, the partial pressure of said diol being about 0.1-10 torr, until the proportion of acidic end groups in said polyester has been substantially reduced; and
    (B) subjecting the product of step A to solid state polymerization at a maximum pressure of about 1 torr.

2. A method according to claim 1 wherein the diol used in step A has the formula HO-R$^2$-OH, wherein R$^2$ is the alkylene radical in the poly(alkylene terephthalate).

3. A method according to claim 2 wherein the maximum polyester particle size is 0.5 mm. and the diol partial pressure in step A is about 0.2-5.0 torr.

4. A method according to claim 3 wherein the pressure in step B is about 0.05-0.5 torr.

5. A method according to claim 4 wherein the inert gas in step A is nitrogen.

6. A method according to claim 5 wherein the temperature of step B is substantially equal to that of step A.

7. A method according to claim 6 wherein the number average molecular weight of the product of step B is substantially uniform and is at least about 100,000.

8. A method according to claim 7 wherein the polyester is poly(butylene terephthalate) or poly(ethylene terephthalate) and the diol is correspondingly 1,4-butanediol or ethylene glycol.

9. A method according to claim 8 wherein the esterification catalyst is a sodium, calcium, titanium, copper, zinc, cadmium, mercury, alluminum, germanium, lead, antimony, chromium, manganese, cobalt or nickel compound.

10. A method according to claim 9 wherein the proportion of catalyst in the poly(alkylene terephthalate) is about 80-200 ppm.

11. A method according to claim 10 wherein the catalyst is a titanium compound.

12. A method according to claim 11 wherein the polyester is poly(butylene terephthalate) and the diol is 1,4-butanediol.

13. A method according to claim 12 wherein the diol partial pressure in step A is 2.0-2.5 torr.

14. A method according to claim 13 wherein the temperature of steps A and B is 215-220° C.

15. A method according to claim 11 wherein the polyester is poly(ethylene terephthalate) and the diol is ethylene glycol.

* * * * *